(12) United States Patent
Nakaoka

(10) Patent No.: US 12,726,687 B2
(45) Date of Patent: Sep. 1, 2026

(54) APPARATUS, METHOD, AND STORAGE MEDIUM

(71) Applicant: CANON KABUSHIKI KAISHA, Tokyo (JP)

(72) Inventor: Hiroshi Nakaoka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/178,370

(22) Filed: Mar. 3, 2023

(65) Prior Publication Data

US 2023/0291981 A1 Sep. 14, 2023

(30) Foreign Application Priority Data

Mar. 11, 2022 (JP) ................................. 2022-038230

(51) Int. Cl.
*H04N 23/11* (2023.01)
*G06T 7/50* (2017.01)
*G06V 10/74* (2022.01)

(52) U.S. Cl.
CPC ............... *H04N 23/11* (2023.01); *G06T 7/50* (2017.01); *G06V 10/761* (2022.01); *G06T 2207/10048* (2013.01); *G06T 2207/20228* (2013.01)

(58) Field of Classification Search
CPC .......... H04N 23/11; H04N 23/45; G06T 7/50; G06T 2207/10048; G06T 2207/20228; G06T 2207/10024; G06T 7/593; G06V 10/761
See application file for complete search history.

(56) References Cited

U.S. PATENT DOCUMENTS

2016/0288330 A1* 10/2016 Konolige ............. G05D 1/0242
2020/0065562 A1* 2/2020 Zhou ....................... G06F 21/44
2020/0327686 A1* 10/2020 Zatzarinni ................. G06T 5/50
2022/0295038 A1* 9/2022 Venkataraman ....... H04N 23/74
2022/0414928 A1* 12/2022 Venkataraman ..... G06V 10/145
2023/0177713 A1* 6/2023 Yokokawa ............ H04N 13/15 382/154
2023/0224507 A1* 7/2023 Nishi ..................... H04N 19/96 382/240
2023/0267588 A1* 8/2023 Ng ......................... H04N 9/646 382/100

FOREIGN PATENT DOCUMENTS

JP 2004354714 A 12/2004
JP 2006251683 A 9/2006
JP 2017003749 A 1/2017
JP 2018019348 A 2/2018
JP 2021100253 A 7/2021

* cited by examiner

*Primary Examiner* — Tracy Y. Li
(74) *Attorney, Agent, or Firm* — Canon U.S.A., Inc. IP Division

(57) ABSTRACT

An apparatus records, as a single file, visible light images of a plurality of points of view, invisible light images of a plurality of points of view, meta information about visible light images corresponding to the visible light images of the plurality of points of view, and meta information about invisible light images corresponding to the invisible light images of the plurality of points of view.

9 Claims, 16 Drawing Sheets

FIG.1

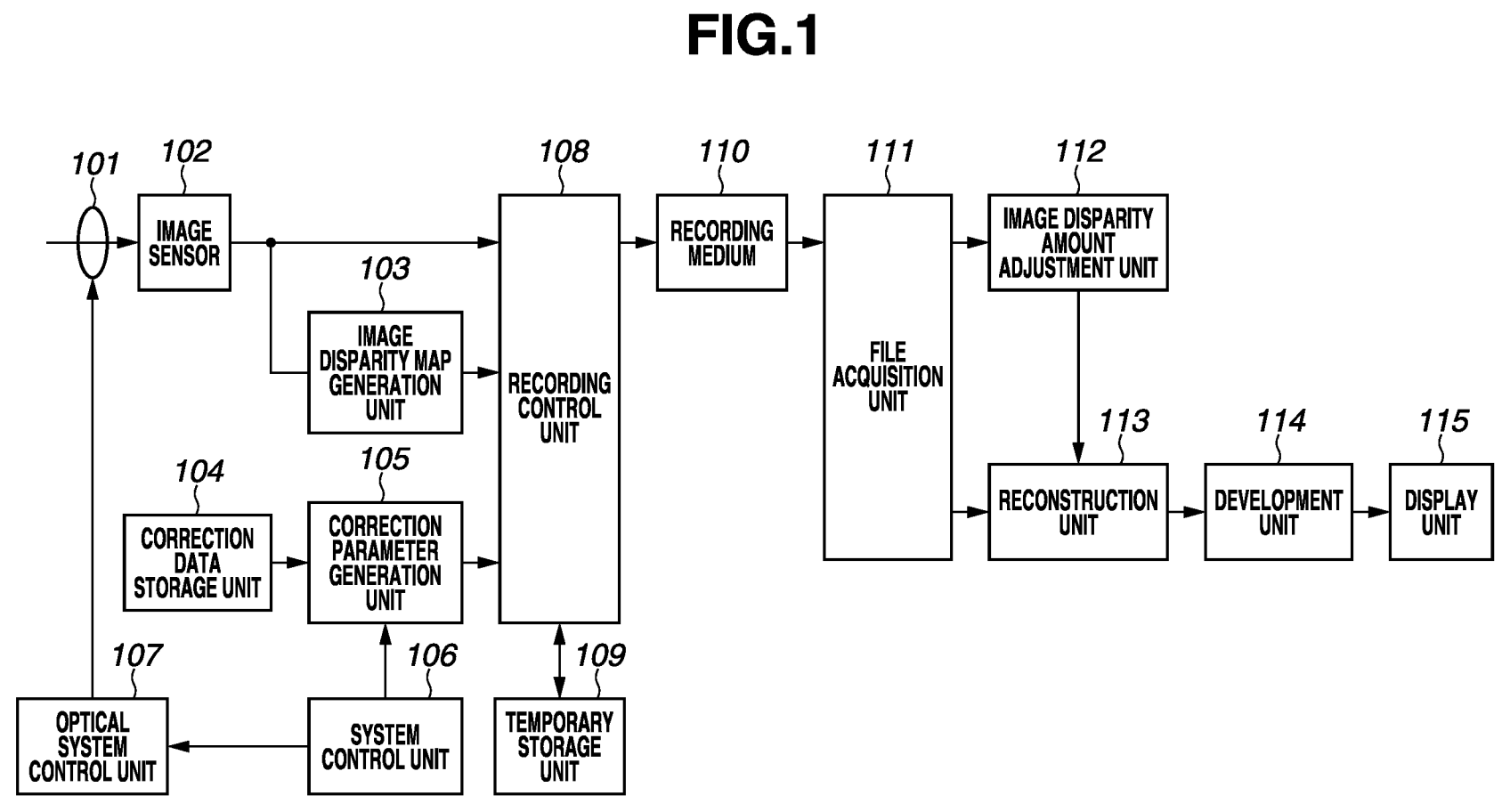

101
102 IMAGE SENSOR
103 IMAGE DISPARITY MAP GENERATION UNIT
104 CORRECTION DATA STORAGE UNIT
105 CORRECTION PARAMETER GENERATION UNIT
106 SYSTEM CONTROL UNIT
107 OPTICAL SYSTEM CONTROL UNIT
108 RECORDING CONTROL UNIT
109 TEMPORARY STORAGE UNIT
110 RECORDING MEDIUM
111 FILE ACQUISITION UNIT
112 IMAGE DISPARITY AMOUNT ADJUSTMENT UNIT
113 RECONSTRUCTION UNIT
114 DEVELOPMENT UNIT
115 DISPLAY UNIT

| | $a_i$ | $b_i$ | $\alpha_i$ | $\beta_i$ |
|---|---|---|---|---|
| i = 2.0 | 0.011 | -0.649 | -0.013 | 0.581 |
| i = 4.0 | 0.008 | -0.433 | -0.005 | 0.318 |
| i = 8.0 | 0.006 | -0.303 | -0.003 | 0.179 |
| i = 16.0 | 0.005 | -0.194 | -0.001 | 0.102 |

FIG.12

RAWIMG.PIC

| VISIBLE_PARALLAX0 |
| --- |
| VISIBLE_PARALLAX1 |
| VISIBLE_DISPARITY |
| INVISIBLE_PARALLAX0 |
| INVISIBLE_PARALLAX1 |
| CORRECTION_PARAMETER |

1403
CORRECTION DATA STORAGE UNIT
1402
CORRECTION PARAMETER GENERATION UNIT
1404
IMAGE DISPARITY AMOUNT ADJUSTMENT UNIT
113
RECONSTRUCTION UNIT
114
DEVELOPMENT UNIT
115
DISPLAY UNIT
1401
FILE ACQUISITION UNIT
110
RECORDING MEDIUM
108
RECORDING CONTROL UNIT
109
TEMPORARY STORAGE UNIT
103
IMAGE DISPARITY MAP GENERATION UNIT
106
SYSTEM CONTROL UNIT
102
IMAGE SENSOR
101
107
OPTICAL SYSTEM CONTROL UNIT

FIG.16

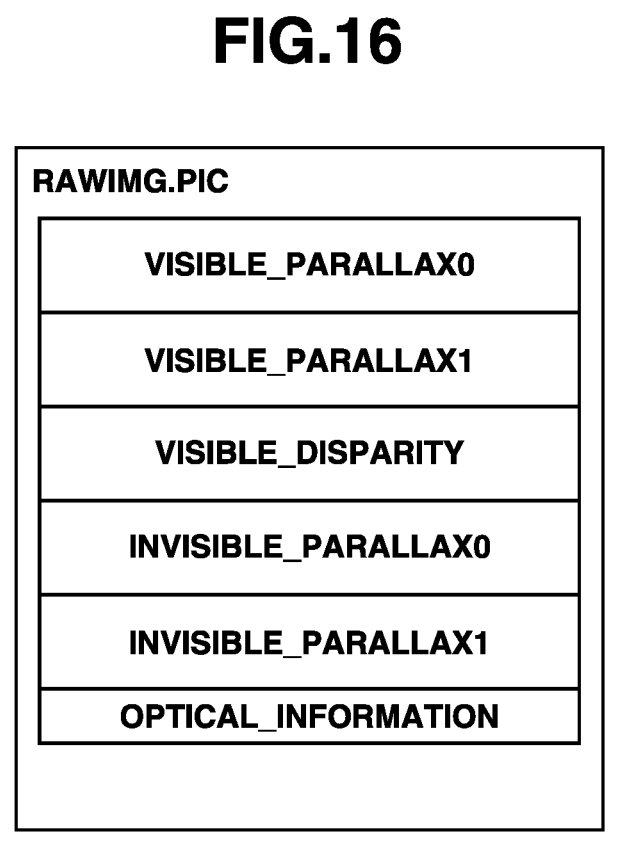

RAWIMG.PIC

| VISIBLE_PARALLAX0 |
| --- |
| VISIBLE_PARALLAX1 |
| VISIBLE_DISPARITY |
| INVISIBLE_PARALLAX0 |
| INVISIBLE_PARALLAX1 |
| OPTICAL_INFORMATION |

APPARATUS, METHOD, AND STORAGE MEDIUM

BACKGROUND

Technical Field

The aspect of the embodiments relates to an apparatus configured to record a plurality of parallax images captured at a plurality of wavelengths and related information, and a method for controlling the image processing apparatus.

Description of the Related Art

Techniques for acquiring image signals using a sensor having sensitivity to an invisible range, such as infrared rays, and acquiring information that is normally invisible to human eyes are known. Japanese Patent Application Laid-Open No. 2017-003749 discusses an image processing system for acquiring images focused on both visible and invisible ranges by controlling a focus lens position and a diaphragm based on an in-focus position of one of the visible and invisible ranges to include both the visible and invisible ranges within a depth of field.

A focal position of a condensing optical system, such as a lens, changes depending on a wavelength of light. Further, in a case where there is a single optical system that forms an image as in a configuration discussed in Japanese Patent Application Laid-Open No. 2017-003749, focusing on one of the visible and invisible ranges causes the other one of the visible and invisible ranges to become out of focus, thereby forming a blur image. According to Japanese Patent Application Laid-Open No. 2017-003749, a light flux diameter is reduced using a diaphragm mechanism, so that the amount of light from a subject decreases. This causes an issue of decreased quality of image signals obtained from images.

SUMMARY

According to an aspect of the embodiments, an apparatus includes a first acquisition unit configured to acquire a plurality of visible light images having different points of view from each other and a plurality of invisible light images corresponding to the plurality of visible light images and having different points of view from each other, a second acquisition unit configured to acquire depth information about a visible light image that corresponds to the plurality of visible light images and depth information about an invisible light image that corresponds to the depth information about the visible light image and corresponds to the plurality of invisible light images, and a generation unit configured to generate a single file including the plurality of visible light images, the depth information about the visible light image, the plurality of invisible light images, and the depth information about the invisible light image.

Further features of the disclosure will become apparent from the following description of exemplary embodiments with reference to the attached drawings.

BRIEF DESCRIPTION OF THE DRAWINGS

FIG. 1 is a block diagram illustrating a configuration according to a first exemplary embodiment.

FIG. 6 is a schematic diagram illustrating a relationship between wavelengths of light and image disparity amounts according to the first exemplary embodiment.

FIG. 11 is a table of coefficients of an approximation formula expressing correction data according to the first exemplary embodiment.

FIG. 12 schematically illustrates a format of a recorded file according to the first exemplary embodiment.

FIG. 16 schematically illustrates a format of a recorded file according to the second exemplary embodiment.

DESCRIPTION OF THE EMBODIMENTS

First Exemplary Embodiment

Figure 2:
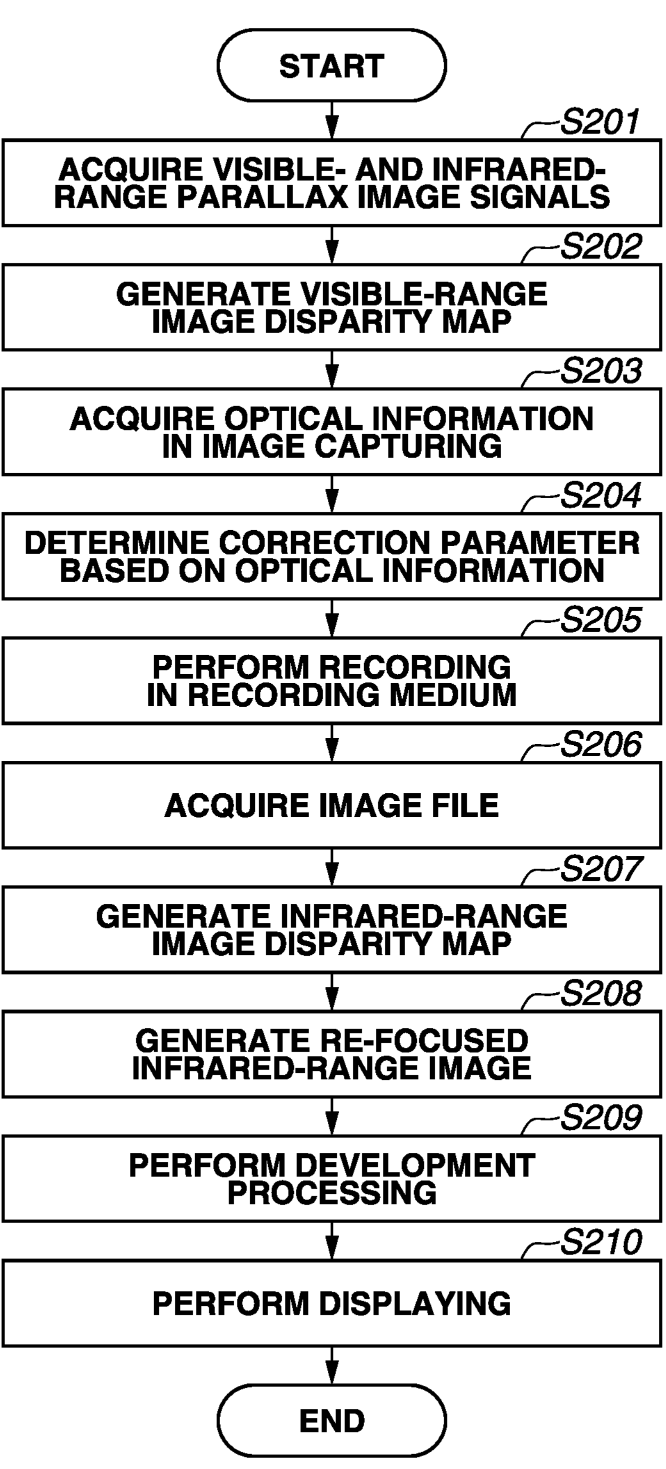
FIG. 2 is a flowchart illustrating a processing flow according to the first exemplary embodiment.

A first exemplary embodiment of the disclosure will now be described with reference to the drawings. FIG. 1 is a block diagram illustrating an image processing system according to the first exemplary embodiment. One or more functional blocks illustrated in FIG. 1 can be realized by hardware, such as an application-specific integrated circuit (ASIC) or a programmable logic array (PLA), or can be realized by a programmable processor, such as a central processing unit (CPU) or a micro-processing unit (MPU), that executes software. One or more functional blocks illustrated in FIG. 1 can also be realized by a combination of software and hardware. Thus, operations that are described below as being performed by different functional blocks can be realized by the same hardware as a performer.

An optical system 101 includes a focus lens, a zoom lens, and a diaphragm mechanism. The optical system 101 condenses a light flux from a subject using the lenses to generate an image signal. An image sensor 102 converts a subject image into an electric signal through photoelectric conversion and outputs the electric signal as an image signal.

The image sensor 102 includes a plurality of photoelectric conversion elements. The plurality of photoelectric conversion elements is configured to receive light by capturing light fluxes incident from a plurality of incidence directions. The image sensor 102 can output a parallax image for each light flux of different incidence directions, or can collectively output image signals obtained by converting light received by the plurality of photoelectric conversion elements into electric signals as a single image signal. An image disparity map generation unit 103 generates an image disparity map from the parallax images obtained by the image sensor 102 receiving light fluxes of a visible or invisible light range. A correction data storage unit 104 stores correction data and other data that are necessary for a correction parameter for correcting the image disparity map generated by the image disparity map generation unit 103 and generating a new image disparity map. A correction parameter generation unit 105 generates a correction parameter for correcting the image disparity map generated by the image disparity map generation unit 103 based on the correction data obtained from the correction data storage unit 104. A system control unit 106 controls the entire image processing system according to the present exemplary embodiment. The system control unit 106 transmits optical system control information for controlling the optical system 101 to an optical system control unit 107 described below based on an image capturing situation. The system control unit 106 also transmits information about the diaphragm mechanism of the optical system 101 as optical information to the correction parameter generation unit 105.

The optical system control unit 107 transmits an optical system control signal to the focus lens, the zoom lens, and the diaphragm mechanism of the optical system 101 based on the optical system control information transmitted from the system control unit 106. A recording control unit 108 performs control for receiving the image signal, the image disparity map, and the correction parameter to record the image signal, the image disparity map, and the correction parameter in a recording medium 110 described below. A temporary storage unit 109 temporarily stores the image signal and, for example, the image disparity map and the correction parameter. The recording medium 110 stores data output from the recording control unit 108. The recording medium 110 is an auxiliary storage apparatus such as a memory card.

A file acquisition unit 111 reads a file recorded in the recording medium 110 and outputs necessary data from the read file to a subsequent signal processing unit. An image disparity amount adjustment unit 112 corrects a visible-range image disparity map based on the visible-range image disparity map and the correction parameter output from the file, and generates an infrared-range (invisible light range) image disparity map. A reconstruction unit 113 reconstructs an image through re-focus processing based on, for example, an infrared-range parallax image (invisible light image) output from the file acquisition unit 111 and the infrared-range image disparity map output from the image disparity amount adjustment unit 112. A development unit 114 performs development processing on, for example, a re-focused infrared-range image output from the reconstruction unit 113 so that the developed image can be displayed on a display unit 115 described below. The display unit 115 displays, for example, a developed infrared-range image developed by the development unit 114 to a user. The display unit 115 includes, for example, a liquid crystal panel.

A processing flow according to the first exemplary embodiment will now be described with reference to FIG. 2. The processing of each step is performed by a corresponding unit based on an instruction from the system control unit 106 or the system control unit 106.

Figure 3:
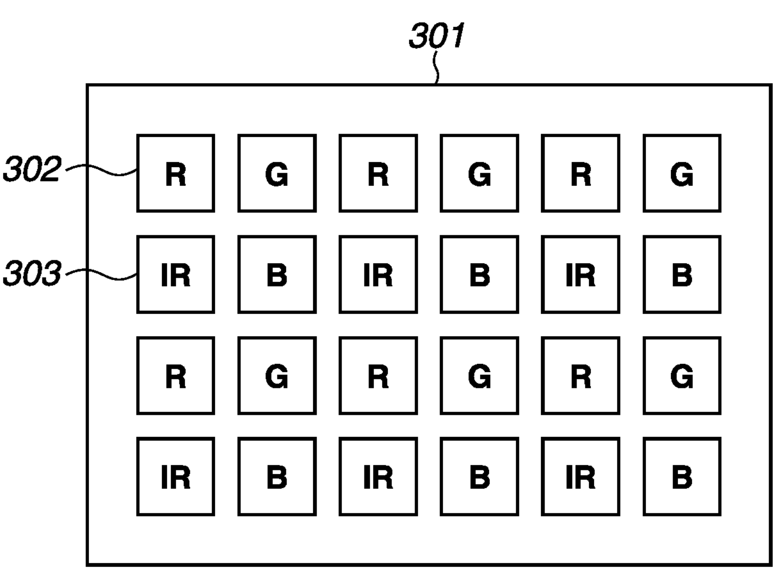
FIG. 3 is a schematic diagram illustrating an example of an arrangement of color filters of an image sensor according to the first exemplary embodiment.

In step S201, visible-range and infrared-range parallax image signals are acquired from the image sensor 102. FIG. 3 schematically illustrates an array of pixel portions of the image sensor 102.

Figure 4:
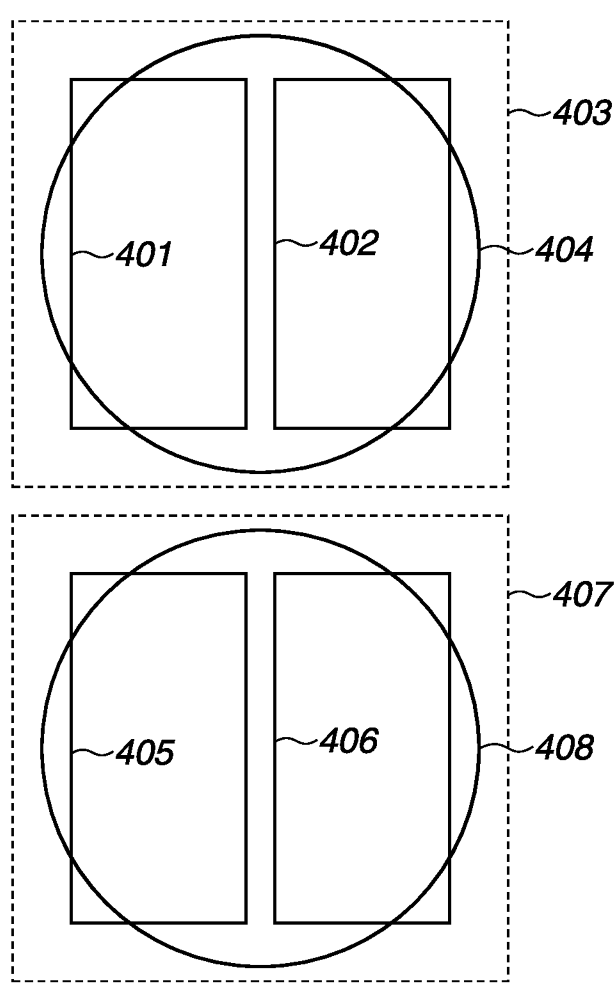
FIG. 4 is a schematic diagram illustrating a structure of pixel portions of the image sensor according to the first exemplary embodiment.

A light receiving unit 301 includes photoelectric conversion elements, such as photodiodes, arrayed two-dimensionally, and a color filter for transmitting a specific wavelength band of light fluxes from a subject is provided over each photoelectric conversion element. A color filter 302 transmits visible light such as red light, and an infrared filter 303 transmits infrared light and has a higher light acquisition sensitivity to the infrared range than to the visible range. Other filters, such as a filter (G) that transmits green light and a filter (B) that transmits blue light, are also arranged regularly as the color filter 302. A light flux transmitted through the color filters 302 is photoelectrically converted by the photoelectric conversion portions situated immediately below the color filters 302 into electric signals, and the electric signals are output from the image sensor 102. FIG. 4 is a diagram illustrating a relationship between the photoelectric conversion elements and a microlens of the image sensor 102. As illustrated in FIG. 4, a pixel portion 403 of the image sensor 102 includes a single microlens 404 for two photoelectric conversion portions 401 and 402. The color filter 302 or the infrared filter 303 described above is formed over the microlens 404 of each pixel portion on a one-on-one basis. Specifically, signals from the pixel portions that are provided with the color filter 302 are acquired as a pixel signal of a visible-range parallax image (a plurality of visible light images having different points of view from each other). Further, signals from the pixel portions that are provided with the infrared filter 303 are acquired as a pixel signal of an invisible-range parallax image (a plurality of invisible light images having different points of view from each other, infrared light image). Similarly, a pixel portion 407 is formed by including a single microlens 408 in common to two photoelectric conversion portions 405 and 406. A signal is individually acquired from each of the paired photoelectric conversion portions of the above-described structure, whereby an image signal of received light fluxes of different incidence directions is acquired. Further, an image signal for displaying on or recording in an image processing apparatus or an image capturing apparatus can be acquired by mixing the signals from each of the paired photoelectric conversion portions together. Other pixel portions on the image sensor 102 are situated as illustrated and are alternately arranged in horizontal and vertical directions on the image sensor 102.

In step S201, the electric signals converted by the photoelectric conversion portions are output as an image signal from the image sensor 102 having the above-described configuration. According to the first exemplary embodiment, image signals situated at the photoelectric conversion portions 401 and 405 are output as a first parallax image, and image signals situated at the photoelectric conversion portions 402 and 406 are output as a second parallax image. The foregoing configuration makes it possible to acquire both a visible-range parallax image and an infrared-range parallax image simultaneously from the image sensor 102.

In step S202, an image disparity map (visible-range image disparity map) is generated from the visible-range parallax images. The image disparity map generation unit 103 calculates an image disparity amount between the first and second parallax images of the visible range acquired from the image sensor 102, generates an image disparity map by two-dimensionally mapping the image disparity amount, and outputs the generated image disparity map as an image disparity map to the recording control unit 108.

Figure 5:
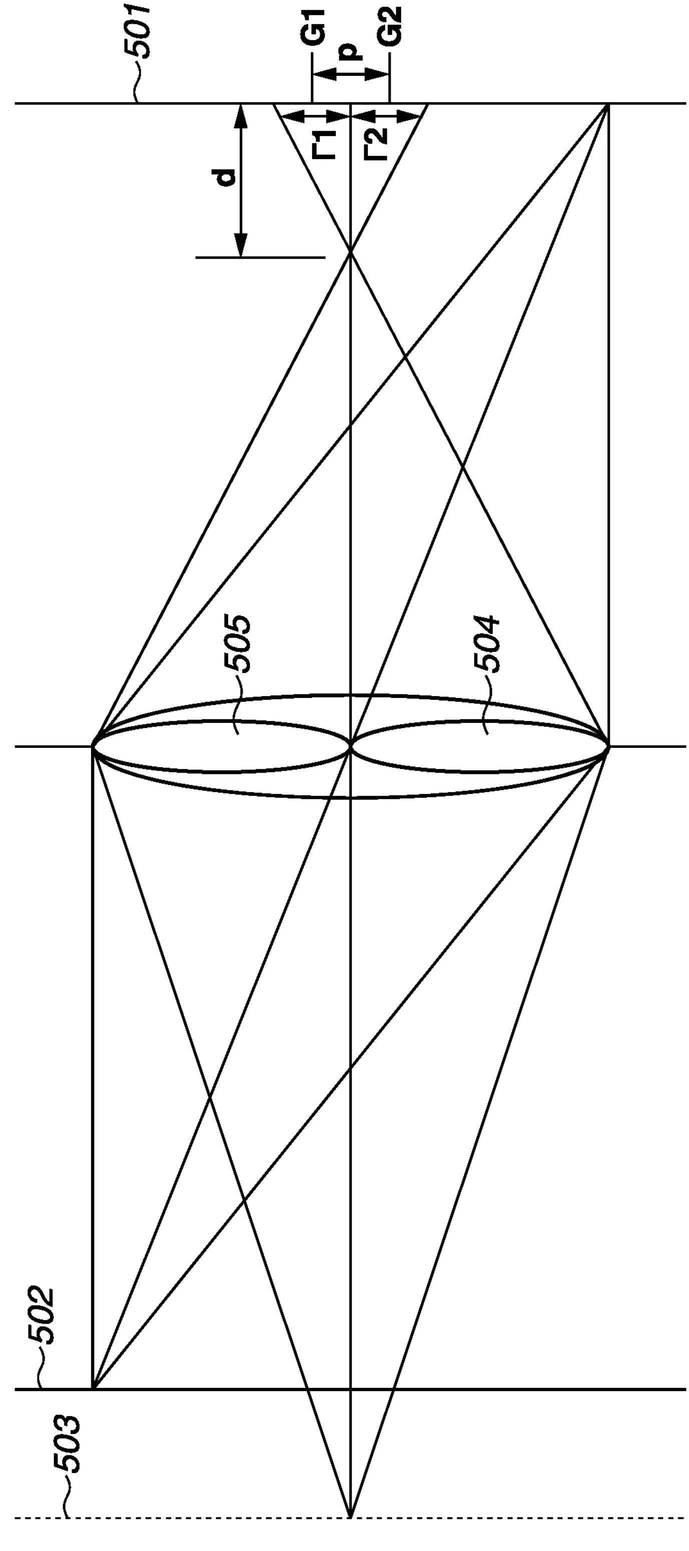
FIG. 5 is a schematic diagram illustrating a relationship between a defocus amount and an image disparity amount according to the first exemplary embodiment.

FIG. 5 is a diagram illustrating an image disparity amount between the first and second parallax images. In FIG. 5, the image sensor 102 is placed on an image capturing plane 501. An exit pupil of the optical system 101 is divided into two pupil portion regions 504 and 505. In FIG. 5, the letter "d" indicates a defocus amount and is a distance from an image forming position to the image capturing plane 501. A subject 502 indicates a position of a subject in an in-focus state (d=0). A subject 503 indicates a position of the subject in a front-focus state (d<0). The front-focus state (d<0) and a back-focus state (d>0) are collectively referred to as a defocus state (|d|>0). In the front-focus state (d<0), a light flux from the subject 503 that has passed through the pupil portion region 504 is once focused and then spreads over a width Γ1 centering on a center of gravity G1 of the light flux and forms a blur image on the image capturing plane 501. The blur image is received by the photoelectric conversion portion 401 of each pixel portion 403 arrayed on the image sensor 102, and a first parallax image is generated.

Thus, the first parallax image is recorded as a subject image of the subject 503 blurred over the blur width Γ1 in the vicinity of the center of gravity G1 on the image capturing plane 501. The blur width Γ1 of the subject image is substantially proportional to the absolute value |d| of the defocus amount d. Similarly, the light flux that has passed through the pupil portion region 505 spreads over a width Γ2 centering on a center of gravity G2 of the light flux. The blur image is received by the photoelectric conversion portion 402, and a second parallax image is generated. Thus, the second parallax image is recorded as a subject image of the subject 502 blurred over the blur width Γ2 in the vicinity of the center of gravity G2 on the image capturing plane 501. The blur width Γ2 of the subject image is also substantially proportional to the magnitude |d| of the defocus amount d. The absolute value |p| of an image disparity amount p (=G1−G2, which is the difference between the centers of gravity of the light fluxes) of the subject image between the first and second parallax images is also substantially proportional to the absolute value |d| of the defocus amount d, accordingly. The same applies to the case of the back-focus state (d>0), except that an image disparity direction of the subject image between the first and second parallax images is opposite to an image disparity direction in the front-focus state. As described above, a radiant light flux from a single point of the subject 502 in the defocus state results in a disparity between the centers of gravity of the first and second parallax images on the image capturing plane 501.

In step S202, the image disparity map generation unit 103 performs correlation calculation processing, such as the sum of absolute differences (SAD), to calculate a correlation between the first and second parallax images and calculates an image disparity amount between the two images based on the correlation. The image disparity amount can be calculated at granularity in units of one pixel of the first and second parallax images, or a region of a predetermined number of pixels can be defined and the image disparity amount can be calculated for each defined region.

Figure 6:
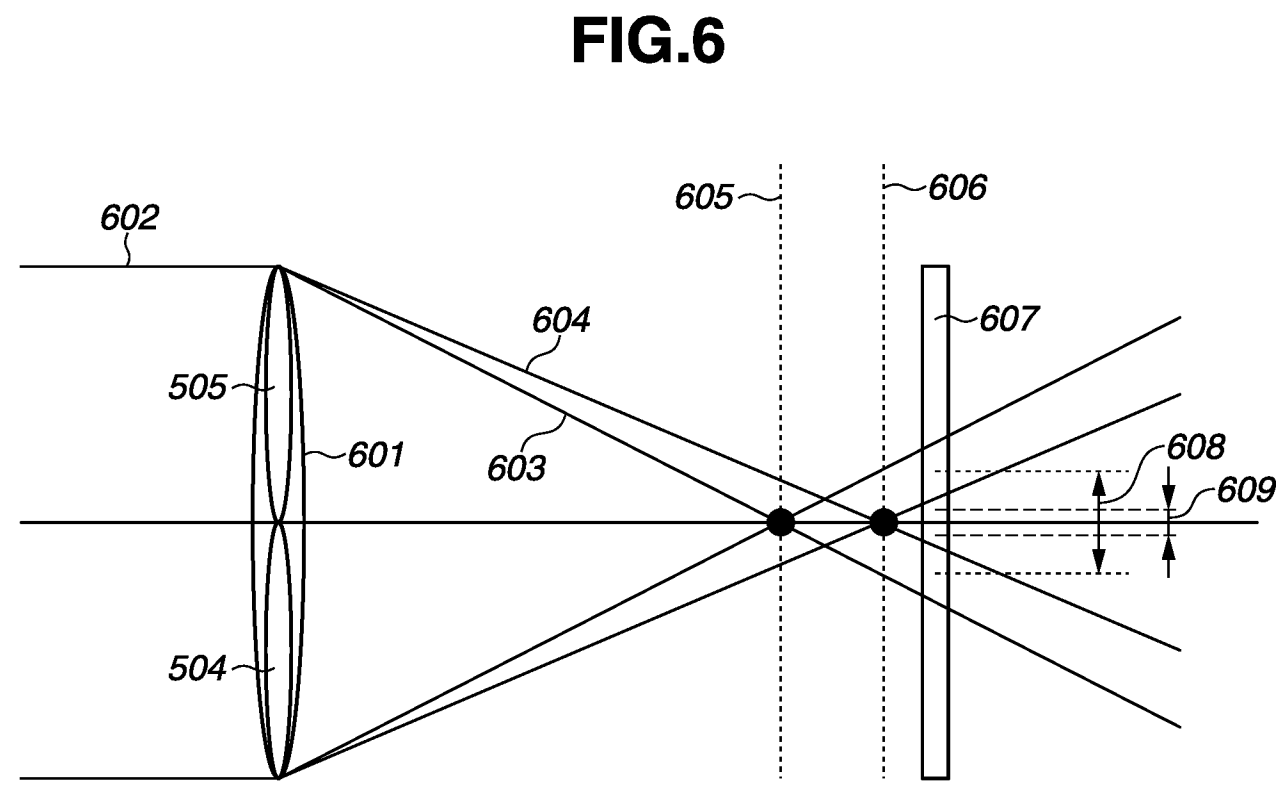

Characteristics of image disparity amounts between parallax images for each wavelength of light will now be described. FIG. 6 is a diagram illustrating image disparity amounts between parallax images of the visible and invisible ranges. In FIG. 6, a visible-range light flux 603 of a light flux 602 passing through a lens 601 from a subject forms an image on an image forming position 605 as a result of being refracted by the lens 601, and an image disparity amount 608 on an image capturing plane 607 is obtained as an image disparity amount between the visible-range parallax images. Meanwhile, an infrared-range light flux of the light flux 602 from the subject becomes a light flux 604 different from the visible-range light flux 603 due to the wavelength dependence of a refractive index of the lens 601 and forms an image on an image forming position 606 different from the visible-range image forming position 605. Consequently, an image disparity amount 609 different from the visible-range image disparity amount 608 is obtained on the image capturing plane 607 as an image disparity amount between infrared-range parallax images. As described above, disparities between image forming positions that are caused by the wavelength dependence of the refractive index cause wavelength dependence of image disparity amounts between parallax images on an image capturing plane. This indicates that, for example, although an image forming plane and an image capturing plane of the visible range correspond to each other, an image forming plane and an image capturing plane of the infrared range do not correspond to each other, and thus an image disparity occurs between parallax images.

Figure 7:
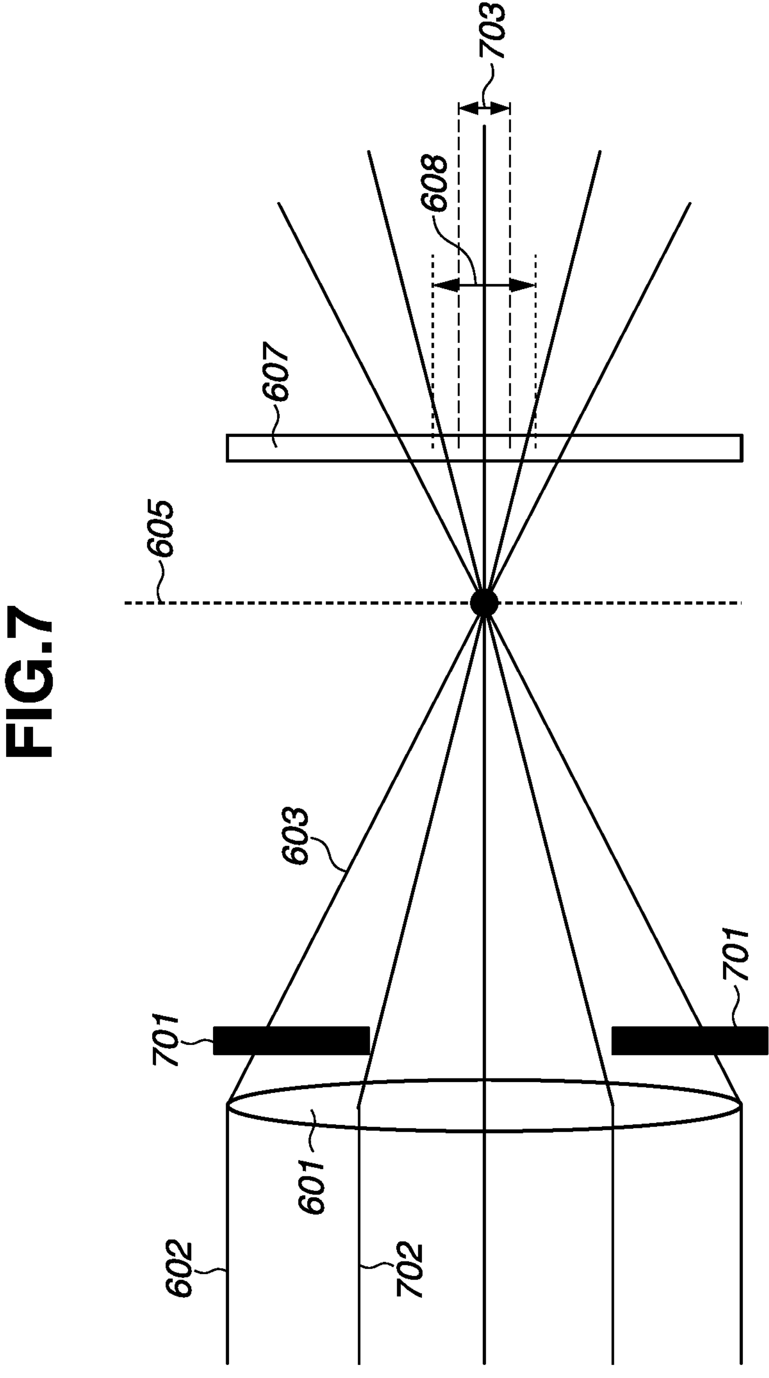
FIG. 7 is a schematic diagram illustrating a relationship between a change in a diaphragm and a change in an image disparity amount according to the first exemplary embodiment

In step S203, the correction parameter generation unit 105 acquires optical information in image capturing from the system control unit 106. Before acquiring correction data from the correction data storage unit 104, the correction parameter generation unit 105 acquires an f-number of the optical system 101 as optical information about the optical system 101 from the system control unit 106. The f-number is a value obtained by normalizing a focal length of the optical system 101 with an effective aperture diameter of the optical system 101. FIG. 7 is a diagram illustrating a change in an image disparity amount in a case where an optical condition changes. FIG. 7 schematically illustrates especially a case where the diaphragm mechanism of the optical system 101 changes. A diaphragm mechanism 701 is used to block part of the light flux 602 from the subject to adjust the amount of light. A light flux 702 is a light flux in a case where the diaphragm mechanism 701 reduces the aperture. The light flux 702 forms an image on the image forming position 605 before the aperture reduction and thereafter forms an image on the image capturing plane 607. At this time, an image disparity amount 703 in the case where the aperture is reduced by the diaphragm mechanism 701 is less than the image disparity amount 608 before the aperture reduction. Thus, there is a characteristic that an image disparity amount on the image capturing plane 607 changes in a case where an effective diameter of the optical system 101 changes although the focal length is unchanged. Considering the visible and infrared ranges individually, both an image disparity amount obtained from the visible-range parallax images and an image disparity amount obtained from the infrared-range parallax images change. Thus, the correction parameter generation unit 105 acquires, from the system control unit 106, the f-number that is optical information in acquiring the visible- and infrared-range parallax images from the image sensor 102. The f-number changes not only by a change in the diaphragm mechanism of the optical system 101 but also by a change in the focal length of the optical system 101 as indicated by the definition of the f-number. Thus, in a case where an optical system has a variable focal length, e.g., a zoom lens, focal length information can be acquired from the system control unit 106.

In step S204, the correction parameter generation unit 105 acquires correction data from the correction data storage unit 104 based on the optical information acquired from the system control unit 106, determines a correction parameter, and outputs the determined correction parameter to the recording control unit 108.

Figure 8:
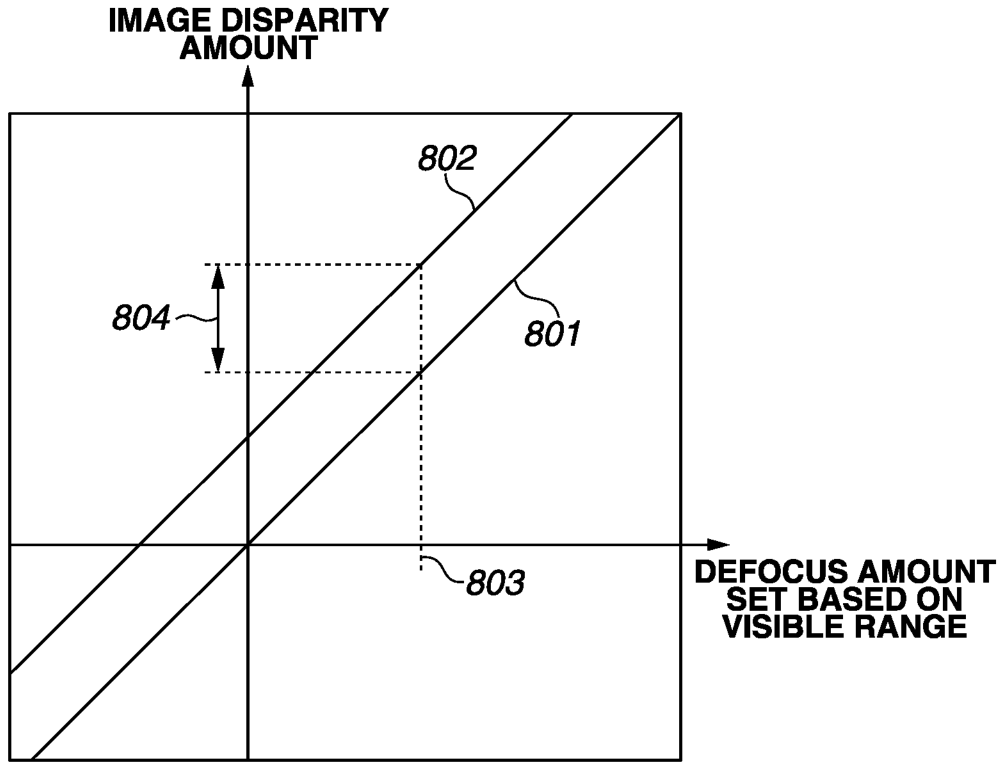
FIG. 8 is a graph illustrating an example of a correction parameter according to the first exemplary embodiment.

FIG. 8 is a diagram illustrating a relationship between image disparity amounts obtained from the visible-range parallax images and image disparity amounts obtained from the infrared-range parallax images. FIG. 8 schematically illustrates image disparity amounts (visible-range image disparity amount) obtained from the visible-range parallax images and image disparity amounts (invisible-range image disparity amount) obtained from the infrared-range parallax images, with respect to defocus amounts set based on visible-range light flux on a horizontal axis. In a case where the defocus amount is zero, the image forming plane and the image capturing plane correspond to each other, so that the image disparity amount obtained from the visible-range parallax images is also zero. As the defocus amount increases, the image forming plane and the image capturing plane no longer correspond to each other, so that a characteristic 801 is exhibited. While the characteristic 801 may not always be linear in reality due to optical characteristics of the optical system 101 and the image sensor 102, the characteristic 801 is illustrated as a linear line passing through the origin point for description. Meanwhile, as illustrated in FIG. 6, an image disparity amount obtained from the infrared-range parallax images does not become zero due to the wavelength dependence of the refractive index of the optical system 101, even in a case where the defocus amount set based on visible-range light flux is zero. Further, the image disparity amounts obtained from the infrared-range parallax images exhibit a characteristic 802 different from that of the image disparity amounts obtained from the visible-range parallax images. At a defocus amount 803, there is a difference 804 between the image disparity amount obtained from the visible-range parallax images and the image disparity amount obtained from the infrared-range parallax images. Thus, an image disparity amount obtained from the infrared-range parallax images can be estimated by applying the difference information as a correction parameter to an image disparity amount obtained from the visible-range parallax images.

Figure 9:
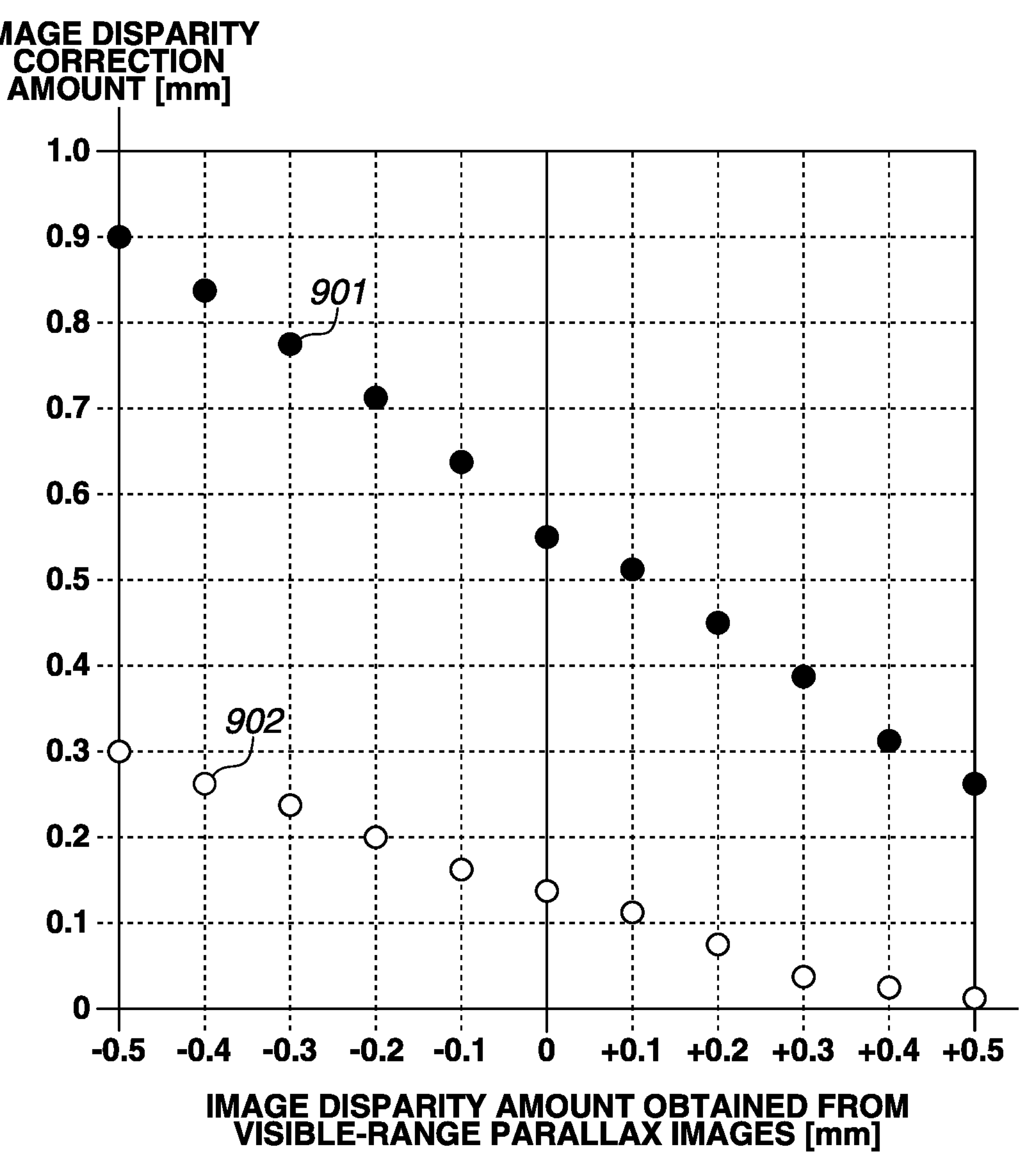
FIG. 9 is a graph illustrating an example of correction data for each f-number according to the first exemplary embodiment.

The correction data stored in the correction data storage unit 104 will now be described with reference to FIG. 9. FIG. 9 is a graph schematically illustrating differences between image disparity amounts obtained from the visible-range parallax images and image disparity amounts obtained from the infrared-range parallax images. A graph 901 is an example thereof, and discrete difference information corresponding to the image disparity amounts obtained from the visible-range parallax images is stored as correction data in the correction data storage unit 104. The correction data can be stored in advance in a non-volatile storage apparatus (not illustrated) and can be transferred to the correction data storage unit 104 in activating the image processing system. Further, as illustrated in FIG. 7, in a case where the difference information varies depending on the optical conditions of the optical system 101, correction data for each optical condition is stored in the correction data storage unit 104 as specified by a graph 902. In FIG. 9, two types of optical conditions that are a case where the f-number is 2.0 (901) and a case where the f-number is 4.0 (902) are stored as correction data in the correction data storage unit 104. Further, the correction parameter generation unit 105 reads the most suitable correction data among the plurality of pieces of correction data stored in the correction data storage unit 104 based on the optical conditions acquired from the system control unit 106, and outputs the read correction data as a correction parameter to the recording control unit 108.

Figure 10:
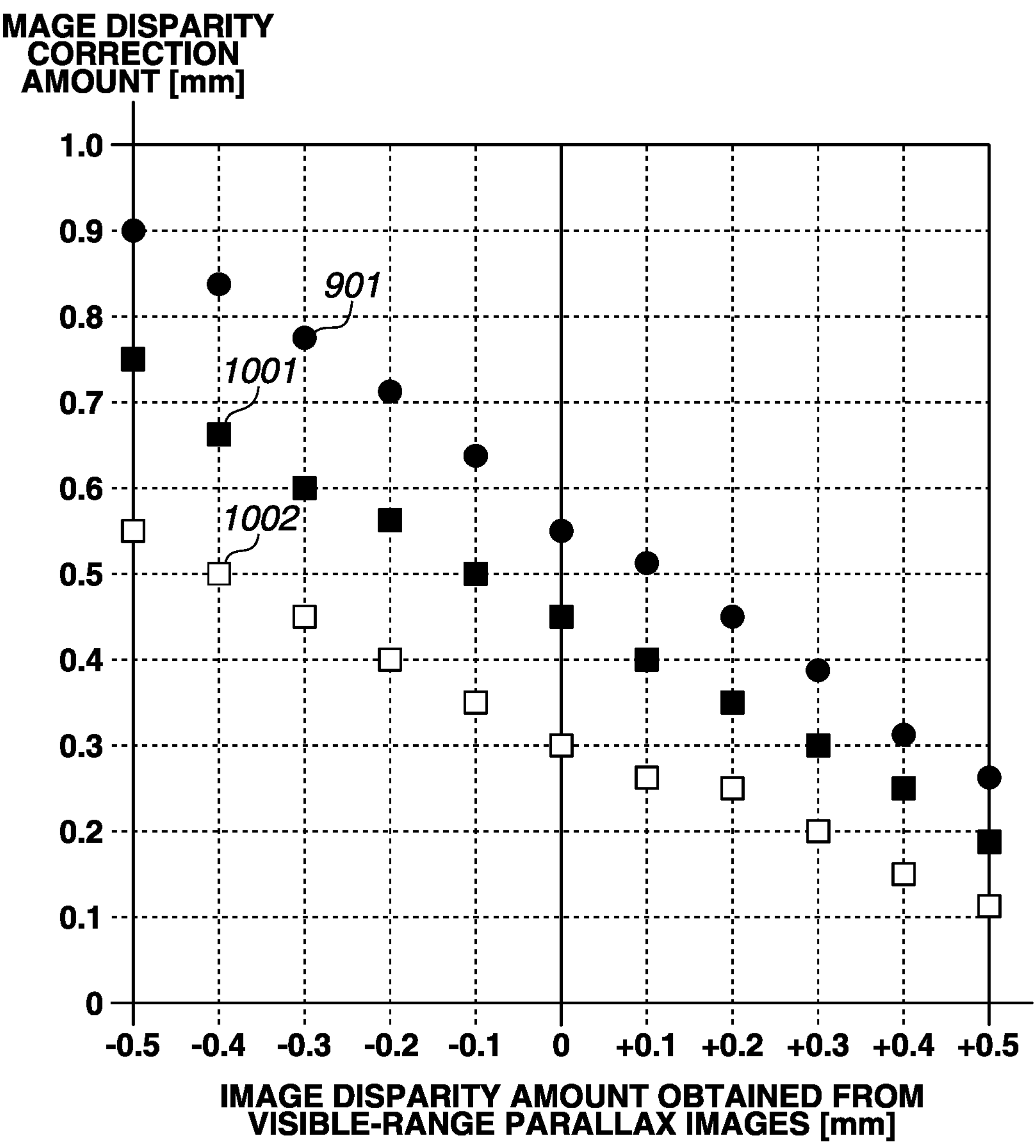
FIG. 10 is a graph illustrating an example of correction data for each image height according to the first exemplary embodiment.

Since the correction data is discrete, intermediate correction data can be generated as needed through known interpolation processing, such as a linear interpolation operation or bicubic interpolation, and a result of the interpolation processing can be output as a correction parameter to the recording control unit 108. FIG. 10 illustrates a case where correction data for each image height that is a distance from an optical axis center on the image capturing plane 607 is held as an optical condition. Although the f-number of the optical system 101 is unchanged, the shape of the exit pupil varies with the image height on the image capturing plane 607, and the image disparity amount may consequently vary with the image height. In this case, as illustrated in FIG. 10, correction data 1001 for an image height position of 10 mm and correction data 1002 for an image height position of 20 mm are prepared separately from correction data 901 for an image height position of 0, and the correction data are stored in the correction data storage unit 104. This makes it possible to generate an appropriate correction parameter for each pixel position of a parallax image.

Further, FIG. 11 is a table illustrating coefficients of an approximation function representing a relationship between image disparity amounts obtained from the visible-range parallax images and correction data, which is illustrated in FIGS. 9 and 10. Correction data p_i is correction data in a case where x is an image disparity amount obtained from the visible-range parallax images, and approximating the correction data p_i as a linear function provides a function expressed by formula (1).

$$p\_i=f(r)*x+g(r). \tag{1}$$

In the formula 1, f(r) is a slope of the linear function, and g(r) is an intercept of the linear function. Further, r is an image height that is a distance from the optical axis center on the image capturing plane 607. The slope f(r) and the intercept g(r) are approximated as a linear function of the image height r as expressed by formulas (2) and (3).

$$f(r)=a\_i*r+b\_i. \tag{2}$$

$$g(r)=\alpha\_i*r+\beta\_i. \tag{3}$$

The subscript "_i" indicates variations of the f-number, and a_i, b_i, α_i, and β_i for each f-number are stored in a table as illustrated in FIG. 11, which is stored in the correction data storage unit 104. After acquiring the f-number as optical information from the correction parameter generation unit 105, the system control unit 106 acquires four pieces of correction data from the table illustrated in FIG. 11 depending on the f-number.

This enables the correction parameter generation unit 105 to calculate a correction parameter based on the approximation functions using less correction data and to output the calculated correction parameter to the recording control unit 108. Alternatively, the four pieces of read correction data can be output directly as a correction parameter to the recording control unit 108.

In step S205, the recording control unit 108 records, in the recording medium 110, the visible-range parallax images, the infrared-range parallax images, the visible-range image disparity map, and the correction parameter for the infrared range (invisible range). Further, the visible-range parallax images, the infrared-range parallax images, the visible-range image disparity map, and the correction parameter for the infrared range (invisible range) can be buffered temporarily using the temporary storage unit 109 and arranged in a predetermined file format, and the file can be recorded in the recording medium 110. FIG. 12 schematically illustrates a file format recorded in the recording medium 110. In the single file format, a first parallax image VISIBLE_PARALLAX0 of the visible range, a second parallax image VISIBLE_PARALLAX1 of the visible range, and a visible-range image disparity map VISIBLE_DISPARITY associated with the foregoing two images are stored. Further in the single file format, a first parallax image INVISIBLE_PARALLAX0 of the infrared range and a second parallax image INVISIBLE_PARALLAX1 of the infrared range are also stored together with a correction parameter CORRECTION_PARAMETER that is associated with the foregoing images. Further, header information indicating whether the correction parameter is for generating a visible-range image disparity map or for generating an infrared-range image disparity map can also be recorded. Further, there is a case where an image disparity amount is generated for each predetermined region in generating an image disparity map from the visible-range parallax images by the image disparity map generation unit 103. In this case, the generated image disparity map may differ in image size from the infrared-range parallax images, whereby size information indicating a relationship of the image size of the generated image disparity maps can be recorded together as header information about the image disparity map data. Alternatively, the ratio between the image sizes of the images can be recorded as header information.

The following steps S206 to S210 are the steps of reading images and corresponding meta information from the image file recorded in the recording medium 110, and displaying the read images or the read meta information. These steps can also be performed by an apparatus provided separately from the image processing apparatus that records the image file in the recording medium 110. A form in which the same image capturing apparatus reads an image file and performs processing during reproduction according to the present exemplary embodiment will now be described as an example.

In step S206, the file acquisition unit 111 reads the file recorded in the recording medium 110. From the read file, the first parallax image VISIBLE_PARALLAX0 of the visible range, the second parallax image VISIBLE_PARALLAX1 of the visible range, the visible-range image disparity map VISIBLE_DISPARITY associated with the foregoing two images, the first parallax image INVISIBLE_PARALLAX0 of the infrared range, the second parallax image INVISIBLE_PARALLAX1 of the infrared range, and the correction parameter CORRECTION_PARAMETER are separated.

In step S207, the image disparity amount adjustment unit 112 generates an infrared-range image disparity map based on the correction parameter and the visible-range image disparity map. The correction parameter output from the file acquisition unit 111 is stored in a primary storage unit (not illustrated) in the image disparity amount adjustment unit 112, and the correction parameter for the infrared range is applied to the visible-range image disparity map, whereby an infrared-range image disparity map is generated. Since the correction parameter is expressed as the difference between the image disparity amount between the visible-range parallax images and the image disparity amount between the infrared-range parallax images, an infrared-range image disparity map can be obtained through addition operation.

Figure 13:
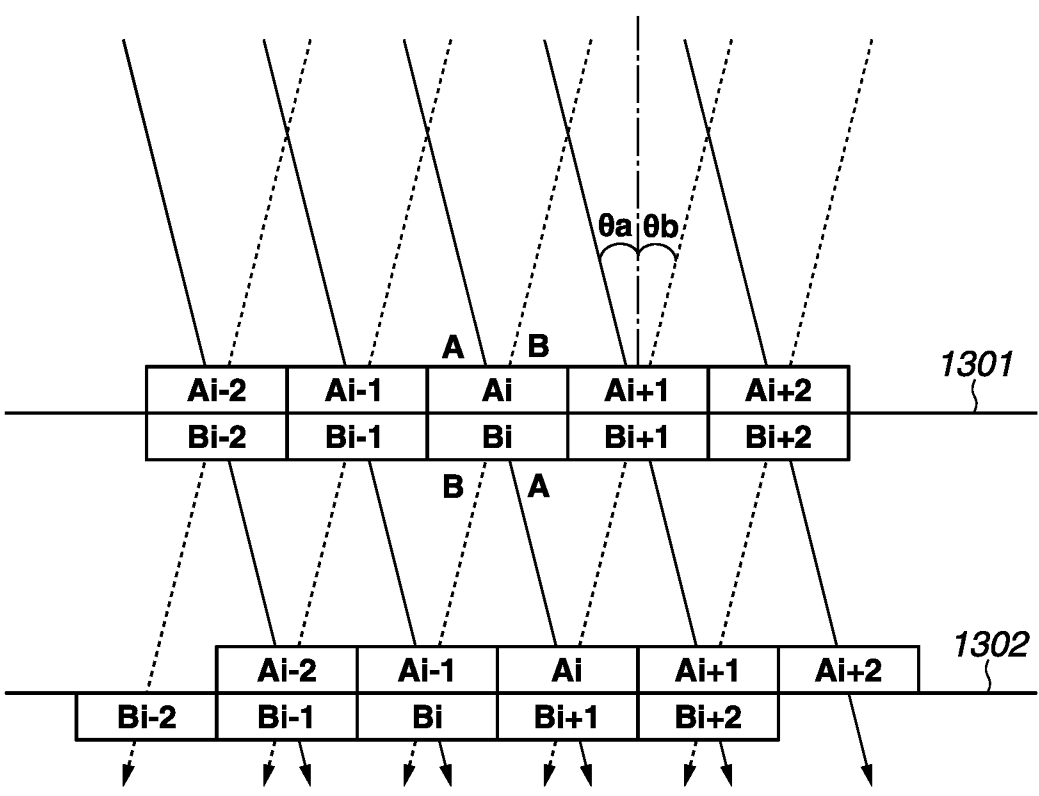
FIG. 13 is a schematic diagram illustrating re-focus processing according to the first exemplary embodiment.

In step S208, the reconstruction unit 113 generates a re-focused infrared-range image based on the infrared-range image disparity map and the infrared-range parallax images. The reconstruction unit 113 reconstructs an image by performing shift addition processing on the first and second parallax images based on the infrared-range image disparity map. FIG. 13 is a schematic diagram illustrating a scheme of the shift addition processing.

FIG. 13 schematically illustrates a first parallax image Ai and a second parallax image Bi obtained by the ith pixel portion 403 of the image sensor 102 arranged on an image capturing plane 1301, where i is an integer. The first parallax image Ai is an image signal based on a light flux incident on the ith pixel portion 403 at a principal ray angle θa that corresponds to the pupil portion region 504 in FIG. 5. The second parallax image Bi is an image signal based on a light flux incident on the ith pixel portion 403 at a principal ray angle θb that corresponds to the pupil portion region 505 in FIG. 5. The principal ray angles θa and θb are angles formed by a line perpendicular to the image capturing plane 1301 and a line corresponding to the center of gravity of the incident light flux.

The first parallax image Ai and the second parallax image Bi have not only light intensity distribution information but also angle-of-incidence information. Thus, it is understood that a reconstructed image (an image obtained in a case where the image capturing plane 1301 is moved to a virtual image forming plane 1302) on the virtual image forming plane 1302 can be generated by considering the following processing. First, the first parallax image Ai is translated along an orientation of the light flux to the virtual image forming plane 1302. Next, the second parallax image Bi is translated along an orientation of the light flux to a position on the virtual image forming plane 1302. By adding the parallax images, a reconstructed image on the virtual image forming plane 1302 is generated.

The amount of translational movement of the first parallax image Ai and the amount of translation movement of the second parallax image Bi each correspond to 0.5 pixels in a horizontal direction. In this case, translationally moving the first parallax image Ai along the light flux to the virtual image forming plane 1302 is equivalent to a shift by +0.5 pixels in the horizontal direction. Translationally moving the second parallax image Bi along the light flux to the virtual image forming plane 1302 is equivalent to a shift by −0.5 pixels in the horizontal direction. Thus, a reconstructed image on the virtual image forming plane 1302 can be generated by relatively shifting the first parallax image Ai and the second parallax image Bi by +1 pixel, i.e., by causing the first parallax image Ai and the second parallax image Bi+1 to correspond to each other and adding the first parallax image Ai and the second parallax image Bi+1 together. Further, a correspondence relationship between a shift amount and an image plane movement amount in moving an image forming plane by shifting the first parallax image Ai and the second parallax image Bi and adding the shifted first parallax image Ai and the shifted second parallax image Bi is determined based on the magnitudes of the principal ray angles θa and θb.

The shift amount in the above-described shift addition, a row number, and a column number are respectively denoted by s, j, and i, and A(j, i) and B(j, i) respectively denote a first parallax image of the jth row and the ith column and a second parallax image of the jth row and the ith column. The shift addition processing is expressed by the following formula (4).

$$I(j,i;s)=A(j,i)+B(j,i+s), \quad (4)$$

where I(j, i;s) is a reconstructed image obtained through the shift addition.

The first parallax image A(j, i) and the second parallax image B(j, i) are Bayer arrangements, whereby parallax images of the same color can be added by setting the shift amount s to a multiple of two. Specifically, s=2n (n is an integer).

The image plane movement amount can be changed for each pixel or each region by changing the shift amount s based on the image disparity amount between the parallax images.

The shift amount s is received as the image disparity amount from the image disparity amount adjustment unit 112, and the above-described shift addition processing is performed in units of pixels or in units of regions based on the shift amount s. This enables the image plane movement, i.e., re-focus processing, corresponding to the image disparity amount.

Further, a reconstructed image can be generated after interpolation signals between pixels of the first parallax image A(j, i) and the second parallax image B(j, i) are generated. This makes it possible to set the shift amount s to a non-integer, and the degree of freedom in setting the shift amount s increases.

In step S209, the development unit 114 performs development processing on the re-focused infrared-range image for display. The development processing refers to the conversion processing into a format receivable by the display unit 115. For example, the conversion processing into luminance and color-difference signals such as YUV format is performed. An infrared-range image consists of a single wavelength and is therefore developed as a monochrome image.

In step S210, the display unit 115 displays the developed infrared-range image.

The following benefit is produced by performing the above-described processing. Visible-range parallax images and infrared-range parallax images are simultaneously acquired from the image sensor 102. An image disparity amount between the visible-range parallax images is calculated based on the visible-range parallax images, and an image disparity map is generated. Meanwhile, a correction parameter for the image disparity amounts obtained from the visible-range parallax images is generated without generating an image disparity map from the infrared-range parallax images. The correction parameter indicates a relationship between the image disparity amount between the visible-range parallax images and the image disparity amount between the infrared-range parallax images, and an infrared-range image disparity amount can be estimated from the visible-range image disparity map using the correction parameter. This reduces the processing load in calculating the infrared-range image disparity amount and reduces the amount of file data, thereby enabling efficient use of a recording medium having a limited recording area, such as a memory card.

While a system of acquiring parallax images by dividing the exit pupil using the single image sensor 102 according to the present exemplary embodiment is described above, the present exemplary embodiment is also effective as a method for solving the same issue in a system of acquiring parallax images using two or more image sensors 102 having different points of view from each other.

In the above-described method according to the present exemplary embodiment, a correction parameter for enabling estimation of an image disparity amount of infrared-range parallax images is generated based on an visible-range parallax image disparity map. The present exemplary embodiment is not limited to the method, and a correction parameter for enabling estimation of an image disparity amount of visible-range parallax images can be generated based on an infrared-range parallax image disparity map. Specifically, a configuration can be employed that generates depth information about one of visible and invisible light images and a correction parameter for the other one of the visible and invisible light images. This can be realized within the scope of the disclosure of the present exemplary embodiment because a difference between the setting of the visible range as a basis and the setting of the infrared range as a basis is merely a relative difference between the storing of visible range based data as correction data in the correction data storage unit 104 and the storing of infrared range based data as correction data in the correction data storage unit 104.

While a visible-range image disparity map and a correction parameter are recorded in the recording medium 110 according to the present exemplary embodiment, an infrared-range image disparity map can be recorded instead of a correction parameter without demanding a reduction in recording size. Directly recording an infrared-range (invisible range) image disparity map is beneficial in that a subsequent apparatus that receives an image file and processes the image file does not need an operation and system of reading a correction parameter and correcting a visible-range image disparity map. The image disparity map generation unit 103 generates both visible- and infrared-range image disparity maps and records the visible- and infrared-range image disparity maps, thereby enabling, for example, re-focus processing of an object that can be captured only in the infrared range. It can also be selected whether to record a correction parameter or an infrared-range image disparity map to reduce the data amount of the file to be recorded in the recording medium 110.

While the maps corresponding to the images and the correction parameter are held as the image disparity amount (image disparity map) according to the present exemplary embodiment, the image disparity amount can be converted using the f-number into a defocus amount (defocus map), and the defocus amount (defocus map) can be held. In this case, the correction parameter is also correction data independent of the f-number, and the data amount is reduced. Further, the defocus amount can be converted using a lens parameter (focal length) into a distance (subject distance) between the image capturing apparatus and the subject, and the subject distance (subject distance map) and a correction parameter for the subject distance can be held. According to the present exemplary embodiment, the image disparity amount, the defocus amount, and the subject distance will be referred to collectively as depth information, and maps thereof will be referred to as depth maps. Further, an infrared light image of received infrared-range light is described as an example of an invisible light image according to the present exemplary embodiment. The present exemplary embodiment is not limited to the example, and images corresponding to any wavelength regions in a near- or far-infrared region or an invisible light region, such as an ultraviolet region, used by a multi-spectral camera and corresponding depth information can be used.

Second Exemplary Embodiment

A second exemplary embodiment of the disclosure will now be described with reference to the drawings. The second exemplary embodiment is for a case where a correction parameter is generated after a recorded file is read without recording the correction parameter in the recording medium 110.

Figure 14:
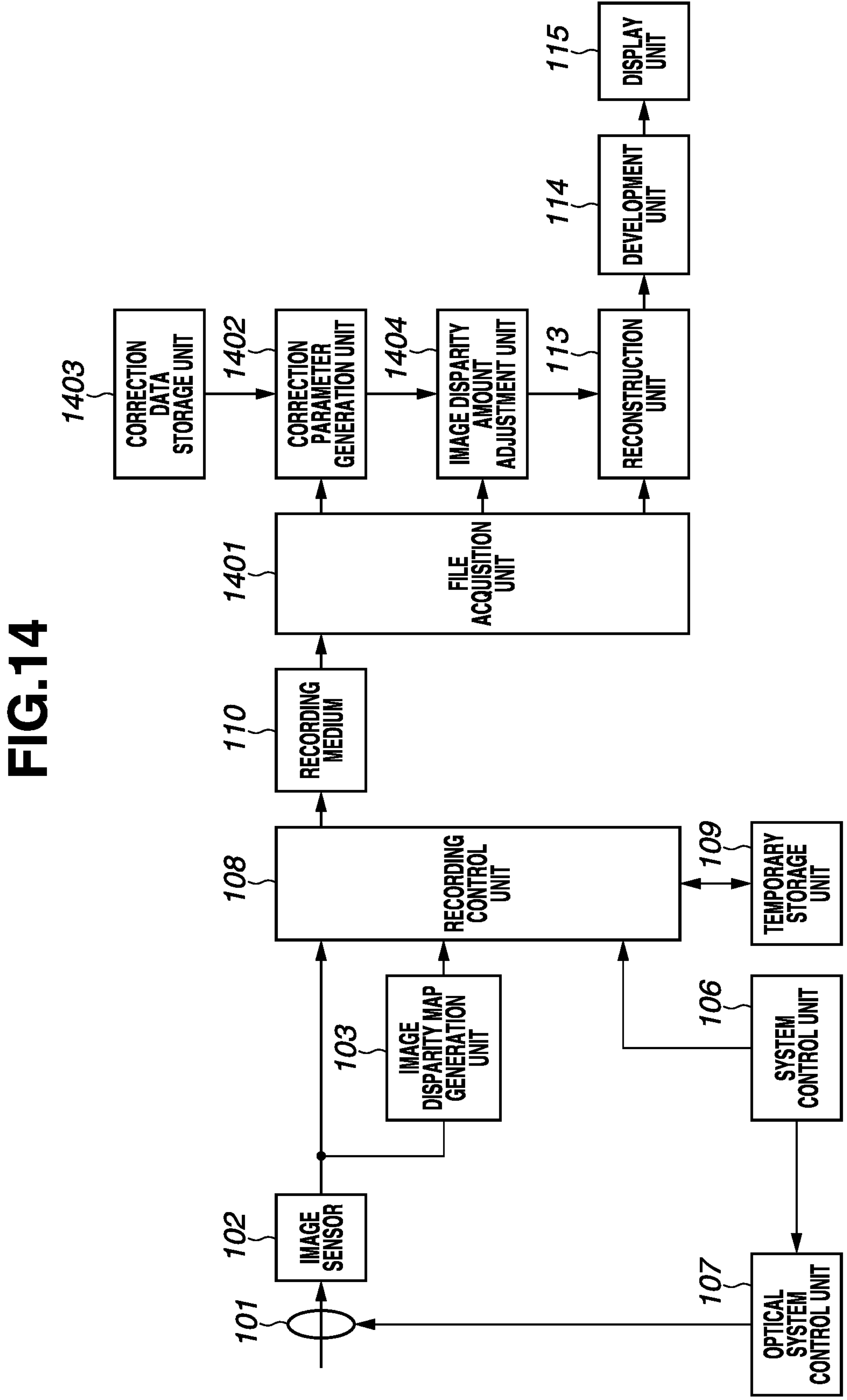
FIG. 14 is a block diagram illustrating a configuration according to a second exemplary embodiment.

FIG. 14 is a block diagram illustrating an image capturing apparatus according to the second exemplary embodiment. Redundant descriptions of components that are given the same reference numerals illustrated in FIG. 1 are omitted. A file acquisition unit 1401 reads a file recorded in the recording medium 110 and outputs necessary data from the read file to a subsequent signal processing unit. A correction parameter generation unit 1402 generates a correction parameter based on optical information output from the file acquisition unit 1401. A correction data storage unit 1403 stores correction data for generating a correction parameter. An image disparity amount adjustment unit 1404 generates an infrared-range image disparity map based on a visible-range image disparity map output from the file acquisition unit 1401 and a correction parameter output from the correction parameter generation unit 1402.

Figure 15:
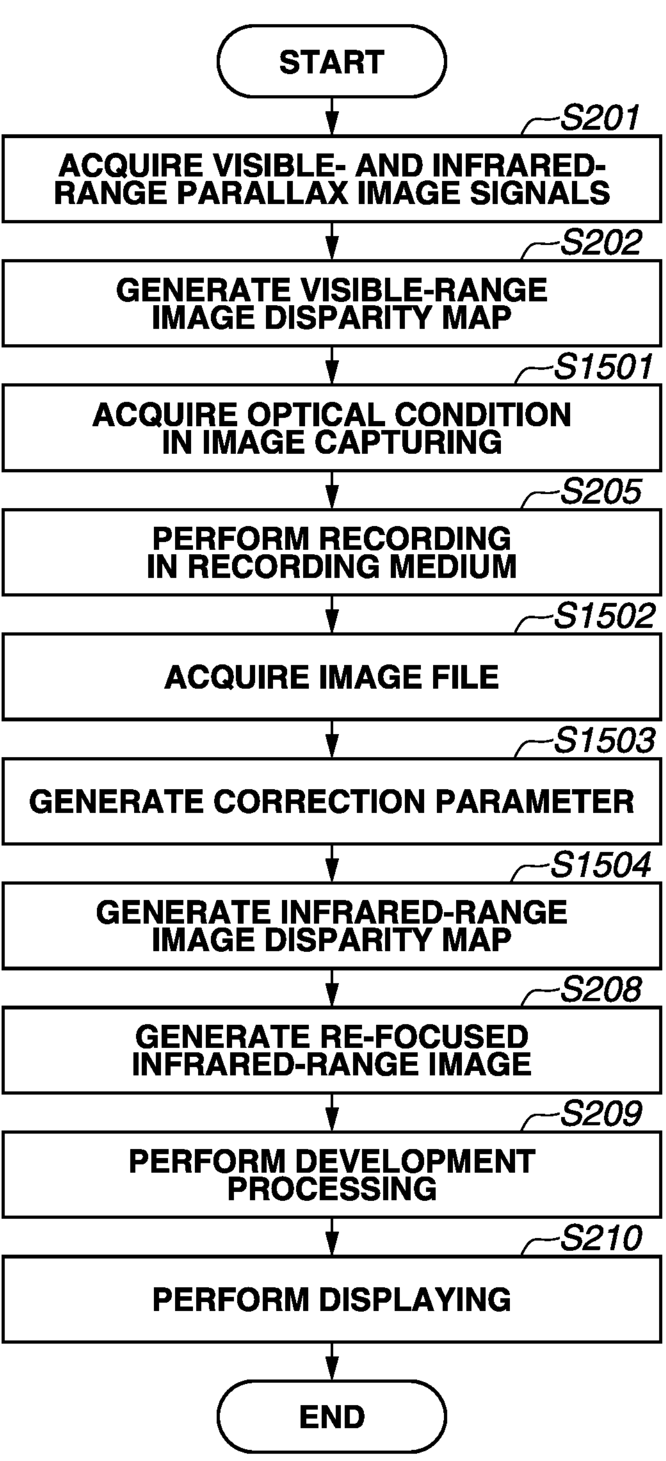
FIG. 15 is a flowchart illustrating a processing flow according to the second exemplary embodiment.

A processing flow according to the second exemplary embodiment will now be described with reference to FIG. 15. Redundant descriptions of steps given the same reference numerals as in FIG. 2 are omitted.

In step S1501, the recording control unit 108 acquires an optical condition in image capturing from the system control unit 106. The acquired optical information is recorded in the recording medium 110 via the recording control unit 108. Unlike the first exemplary embodiment, the recorded file is not the correction parameter CORRECTION_PARAMETER but optical information OPTICAL_INFORMATION as illustrated in FIG. 16. The optical information is the f-number and the focal length of the optical system 101 described above in the first exemplary embodiment.

In step S1502, the file acquisition unit 1401 reads a file recorded in the recording medium 110. From the read file, the file acquisition unit 1401 separates the first parallax image VISIBLE_PARALLAX0 of the visible range, the second parallax image VISIBLE_PARALLAX1 of the visible range, the visible-range image disparity map VISIBLE_DISPARITY associated with the foregoing two images, the first parallax image INVISIBLE_PARALLAX0 of the infrared range, the second parallax image INVISIBLE_PARALLAX1 of the infrared range, and the optical information OPTICAL_INFORMATION.

In step S1503, the correction parameter generation unit 1402 generates a correction parameter based on correction data and optical information. As in step S204 according to the first exemplary embodiment, optical information in capturing the visible-range parallax images is acquired from the file acquisition unit 1401, and correction data is acquired from the correction data storage unit 1403 based on the optical information. The correction parameter generation unit 1402 generates a correction parameter for estimating an infrared-range image disparity map from the visible-range image disparity map based on the acquired correction data, and outputs the generated correction parameter.

In step S1504, the image disparity amount adjustment unit 1404 generates an infrared-range image disparity map based on the correction parameter and the visible-range image disparity map. The image disparity amount adjustment unit 1404 stores The correction parameter output from the correction parameter generation unit 1402 in a primary storage unit (not illustrated) in the image disparity amount adjustment unit 1404, and generates an infrared-range image disparity map by applying the correction parameter to the visible-range image disparity map. Since the correction parameter is expressed as the difference between the image disparity amount between the visible-range parallax images and the image disparity amount between the infrared-range parallax images as described above in the first exemplary embodiment, an infrared-range image disparity map is obtained through the addition operation.

While the correction data for correcting the image disparity amounts is held by the image processing system that acquires the parallax images according to the present exemplary embodiment, an image processing system that captures parallax images does not have to hold the correction data according to the present exemplary embodiment. Instead, an image processing system that reads a file recorded in the recording medium 110 holds the correction data, thereby realizing a further reduction in the file data amount.

The correction data storage unit 1403 can be situated not in an image processing system that reads a recorded file. A similar benefit is produced even in a case where the correction data is collectively stored on, for example, a data server (not illustrated) on a network. This is administratively and operationally suitable because the correction data is centrally managed.

Other Exemplary Embodiments

The aspect of the embodiments is also realized as described below. Specifically, a storage medium that records program codes of software describing procedures for realizing functions of the above-described exemplary embodiments is supplied to a system or an apparatus. Then, a computer (or CPU, MPU) of the system or the apparatus reads the program codes stored in the storage medium and executes the read program codes.

In this case, the program codes read from the storage medium realize the novel functions of the aspect of the embodiments, and the storage medium storing the program codes and the program constitutes the aspect of the embodiments.

Further, examples of a storage medium for supplying the program codes are a flexible disk, a hard disk, an optical disk, and a magneto-optical disk. Further, a compact disk (CD) read-only memory (ROM) (CD-ROM), a CD recordable (CD-R), a CD rewritable (CD-RW), a digital versatile disk (DVD) ROM (DVD-ROM), a DVD random access memory (DVD-RAM), a DVD rewritable (DVD-RW), a DVD recordable (DVD-R), a magnetic tape, a non-volatile memory card, or a ROM can also be used.

Further, the functions of the above-described exemplary embodiments are realized by executing the program codes read by a computer. Cases are also included where the functions of the above-described exemplary embodiments are realized by an operating system (OS) running on the computer by performing part of actual processing or the entire processing based on instructions of the program codes.

Furthermore, the following case is also included. First, the program codes read from the storage medium are written to a memory of a function extension board inserted in a computer or a function extension unit connected to a computer. Thereafter, a CPU of the function extension board or the function extension unit performs part of actual processing or the entire processing based on instructions of the program codes.

The aspect of the embodiments is applicable to not only devices that are mainly intended for image capturing, such as digital cameras, but also devices that include a built-in image capturing apparatus or to which an image capturing apparatus is externally connected, such as mobile phones, personal computers (e.g., laptop, desktop, and tablet types), and game machines. Thus, the term "image capturing apparatus" as used in the present specification is intended to encompass any electronic devices that include an image capturing function.

With the aspect of the embodiments, depth information corresponding to a plurality of visible light images having different points of view from each other and a plurality of invisible light images having different points of view from each other is obtained with ease.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-038230, filed Mar. 11, 2022, which is hereby incorporated by reference herein in its entirety.

What is claimed is:

1. An apparatus comprising:

at least one processor and memory holding a program which makes the processor function as:

a first acquisition unit configured to acquire a plurality of visible light images having different points of view from each other and a plurality of invisible light images corresponding to the plurality of visible light images and having different points of view from each other;

a second acquisition unit configured to acquire depth information about a visible light image that corresponds to the plurality of visible light images and depth information about an invisible light image that corresponds to the plurality of invisible light images, wherein the depth information about the visible light image or the depth information about the invisible light image is generated by using a correction parameter and another one of the depth information, the depth information being one of image disparity amount, defocus amount and a subject distance; and a generation unit configured to generate a single file including the plurality of visible light images, the depth information about the visible light image, the plurality of invisible light images, and the depth information about the invisible light image.

2. The apparatus according to claim 1, wherein the depth information is a mapped image disparity amount of the plurality of visible light images or the plurality of invisible light images.

3. The apparatus according to claim 1, wherein the depth information is a mapped defocus amount or a mapped subject distance of the plurality of visible light images or the plurality of invisible light images.

4. The apparatus according to claim 1, wherein the invisible light image is an infrared light image acquired from a pixel having a higher light acquisition sensitivity to an infrared range than to a visible range.

5. A method for controlling an apparatus, the method comprising:

acquiring a plurality of visible light images having different points of view from each other and a plurality of invisible light images corresponding to the plurality of visible light images and having different points of view from each other;

acquiring depth information about a visible light image that corresponds to the plurality of visible light images, and depth information about an invisible light image that corresponds to the plurality of invisible light images, wherein the depth information about the visible light image or the depth information about the invisible light image is generated by using a correction parameter and another one of the depth information, the depth information being one of image disparity amount, defocus amount and a subject distance; and generating a single file including the plurality of visible light images, the depth information about the visible light image, the plurality of invisible light images, and the depth information about the invisible light image.

6. The method according to claim 5, wherein the depth information is a mapped image disparity amount of the plurality of visible light images or the plurality of invisible light images.

7. The method according to claim 5, wherein the depth information is a mapped defocus amount or a mapped subject distance of the plurality of visible light images or the plurality of invisible light images.

8. The method according to claim 5, wherein the invisible light image is an infrared light image acquired from a pixel having a higher light acquisition sensitivity to an infrared range than to a visible range.

9. A non-transitory computer-readable storage medium storing a program for causing a computer to perform a method for controlling an apparatus, the method comprising:

acquiring a plurality of visible light images having different points of view from each other and a plurality of invisible light images corresponding to the plurality of visible light images and having different points of view from each other;

acquiring depth information about a visible light image that corresponds to the plurality of visible light images, and depth information about an invisible light image that corresponds to the plurality of invisible light images, wherein the depth information about the visible light image or the depth information about the invisible light image is generated by using a correction parameter and another one of the depth information, the depth information being one of image disparity amount, defocus amount and a subject distance; and generating a single file including the plurality of visible light images, the depth information about the visible light image, the plurality of invisible light images, and the depth information about the invisible light image.

* * * * *